(12) United States Patent
Prasad et al.

(10) Patent No.: US 12,548,440 B2
(45) Date of Patent: Feb. 10, 2026

(54) DISTRIBUTED OPTICAL FIBER SENSING (DFOS) SYSTEM AND METHOD OF USING THE SAME

(71) Applicant: NEC Corporation, Tokyo (JP)

(72) Inventors: Hemant Shivsagar Prasad, Tokyo (JP); Daisuke Ikefuji, Tokyo (JP); Tomoyuki Hino, Tokyo (JP)

(73) Assignee: NEC Corporation, Tokyo (JP)

( * ) Notice: Subject to any disclaimer, the term of this patent is extended or adjusted under 35 U.S.C. 154(b) by 265 days.

(21) Appl. No.: 18/358,945

(22) Filed: Jul. 26, 2023

(65) Prior Publication Data

US 2025/0037575 A1 Jan. 30, 2025

(51) Int. Cl.
*G08G 1/00* (2006.01)
*G01H 9/00* (2006.01)
*G08G 1/04* (2006.01)

(52) U.S. Cl.
CPC .............. *G08G 1/04* (2013.01); *G01H 9/004* (2013.01)

(58) Field of Classification Search
CPC ................................ G08G 1/04; G01H 9/004
See application file for complete search history.

(56) References Cited

U.S. PATENT DOCUMENTS

| 12,025,477 | B2* | 7/2024 | Hino | G01D 5/35358 |
| 2014/0114885 | A1* | 4/2014 | Han | G08G 1/0133 |
| | | | | 706/20 |
| 2016/0275788 | A1 | 9/2016 | Wu et al. | |
| 2018/0342156 | A1* | 11/2018 | Martin | G08G 1/052 |
| 2020/0124735 | A1* | 4/2020 | Huang | G01H 9/004 |
| 2020/0200592 | A1* | 6/2020 | Huang | H04B 10/071 |
| 2020/0279217 | A1* | 9/2020 | Gravelle | B65G 1/1373 |
| 2020/0313763 | A1* | 10/2020 | Wang | H04B 10/25753 |
| 2020/0396129 | A1* | 12/2020 | Tedaldi | H04L 41/32 |
| 2020/0401784 | A1* | 12/2020 | Salemi | G06F 18/243 |

(Continued)

FOREIGN PATENT DOCUMENTS

| EP | 2989622 A1 | 3/2016 |
| EP | 2989622 B1 | 9/2017 |

(Continued)

OTHER PUBLICATIONS

Office Action in JP Application No. 2024-118629, mailed Sep. 2, 2025. 6p.

*Primary Examiner* — Truc M Do
(74) *Attorney, Agent, or Firm* — HAUPTMAN HAM, LLP

(57) ABSTRACT

A vehicle tracking method includes receiving distributed optical fiber sensing (DFOS) data. The vehicle tracking method includes identifying hit points within the DFOS data, wherein each of the hit points corresponds to a location of a corresponding vehicle at a detection time. The vehicle tracking method includes clustering the identified hit points to define one or more clusters. The vehicle tracking method includes classifying each of the one or more clusters into a first or second classification based on a quantity of the hit points in each of the one or more clusters and a quantity of the detection times. The vehicle tracking method includes estimating a vehicle parameter of a first vehicle corresponding to the hit points of a first cluster of the one or more clusters, wherein the first cluster has the first classification, and the estimating is based on the hit points of the first cluster.

17 Claims, 12 Drawing Sheets

(56) References Cited

U.S. PATENT DOCUMENTS

| | | | | |
|---|---|---|---|---|
| 2021/0310858 A1* | 10/2021 | Huang | ................... | G01K 11/32 |
| 2021/0312801 A1* | 10/2021 | Ji | ............................... | G06T 5/94 |
| 2021/0312802 A1* | 10/2021 | Chen | ..................... | G06N 20/00 |
| 2023/0027287 A1* | 1/2023 | Huang | ............... | G01D 5/35361 |

FOREIGN PATENT DOCUMENTS

| | | | |
|---|---|---|---|
| EP | 3369085 | A1 | 9/2018 |
| EP | 3369085 | B1 | 12/2019 |
| JP | 2021-121917 | A | 8/2021 |
| JP | 2023-511875 | A | 3/2023 |
| JP | 2024-500979 | A | 1/2024 |
| JP | 2024-507531 | A | 2/2024 |
| WO | 2014/174318 | A1 | 10/2014 |
| WO | 2017/072505 | A1 | 5/2017 |
| WO | 2017/093715 | A1 | 6/2017 |
| WO | 2022/155401 | A1 | 7/2022 |
| WO | 2022/178281 | A1 | 8/2022 |

\* cited by examiner

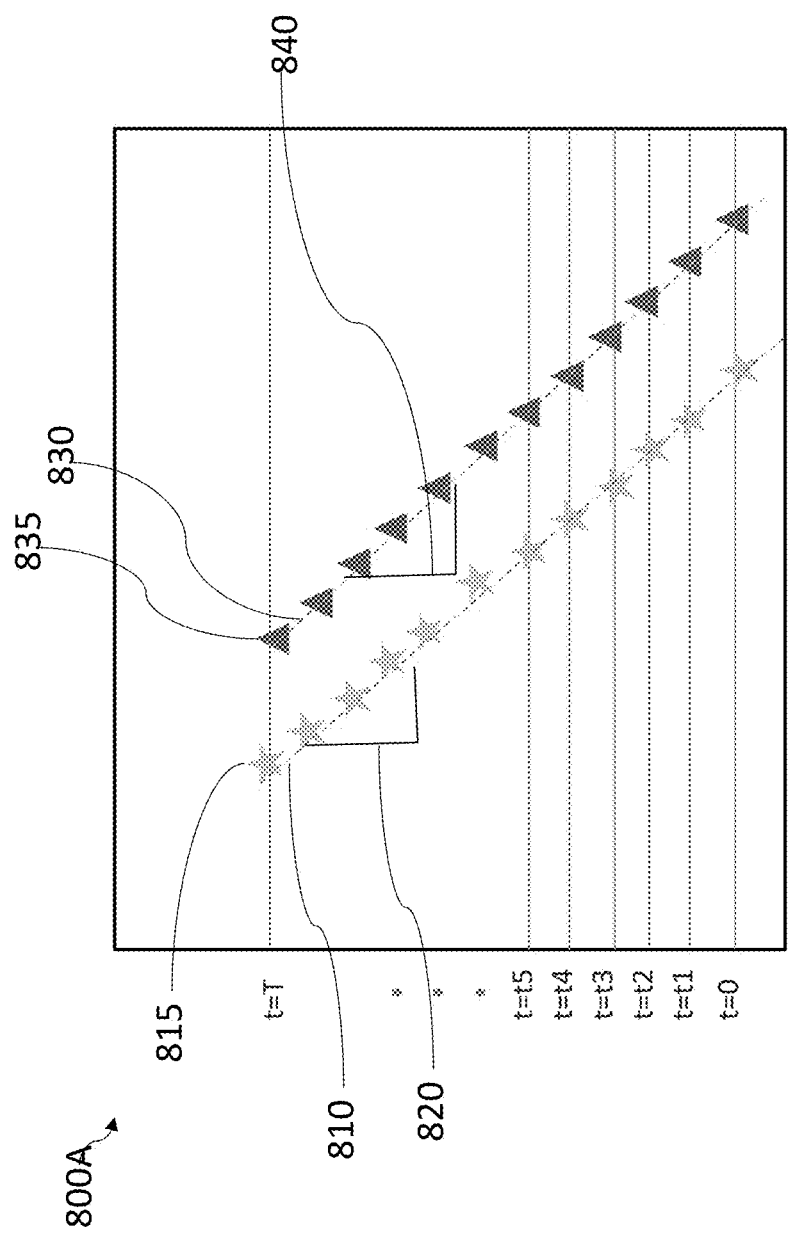

DISTRIBUTED OPTICAL FIBER SENSING (DFOS) SYSTEM AND METHOD OF USING THE SAME

BACKGROUND

Optical fibers are present along numerous roadways. Distributed acoustic sensors (DASs) attached to these optical fibers are able to detect vibrations where the optical fibers are located. In some instances, these vibrations are the result of passing vehicles. DASs are able to collect data related to a number of vehicles, lane location of vehicles and vehicle speed.

DASs generate waterfall data based on time and distance in order to determine traffic parameters. An ability of DASs to detect individual vehicles is related to an amount of noise in a signal detected by the DAS.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8A is a view of a plot for determining a vehicle parameter in accordance with some embodiments.

DETAILED DESCRIPTION

Figure 1A:
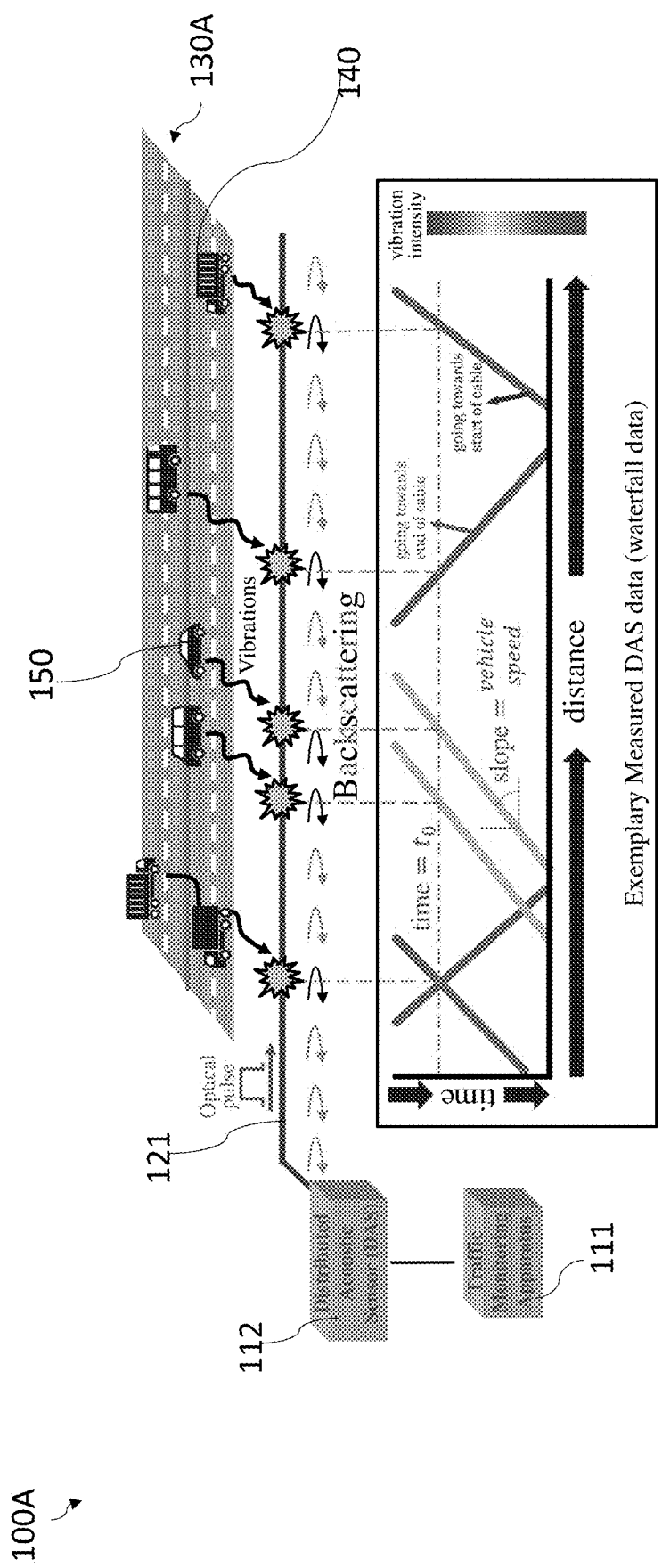
FIG. 1A is a schematic view of a distributed acoustic sensor (DAS) system along a roadway in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Utilizing data from optical fibers along roadways is useful for determining traffic volume, traffic speed, accidents and other events along roadways. In order to increase usefulness of traffic information obtained based on data from optical fibers, determination of vehicle parameters, such as speed, acceleration, lane position, etc., provides information useful for identifying traffic patterns and navigation information. A quality of distributed fiber optic sensing (DFOS) data collected is determined by numerous factors. Since the DFOS data is based, at least in part, on vibrations, a size of a vehicle, an amount of traffic, as well as a type of roadway impact the quality of the data. For example, a single vehicle traveling along a roadway which is directly on the ground is likely to provide a higher quality signal than a large truck traveling over a bridge with high traffic volume. De-noising of the DFOS data is helpful in analyzing the DFOS data in order to use the DFOS data for applications such as traffic analysis, autonomous driving, navigation direction, etc.

Additionally, precision of traffic information assists with navigation of a vehicle traveling along the roadway. By providing drivers with more accurate traffic data, navigation systems and/or navigation applications become more useful to the drivers. Increased precision navigation is also useful for autonomous driver or driver assist functionalities for vehicles. Determining precisely where traffic congestion or a traffic accident has occurred, an autonomous driving vehicle or driver assist system is able to direct a vehicle along a more efficient path.

The current application describes a method and a system for implementing de-noising of DFOS data. The method includes identifying hit points, also called seeds, at various times and locations based on the DFOS data. The DFOS data is analyzed to identify a position of a vehicle at a specific time based on the detected vibrations in the DFOS data. The hit point indicates a location of a vehicle at a specific time. In a situation where the DFOS data has a high quality, a vehicle will generate a single hit point at a specific time. In contrast, in a situation where the DFOS data is noisy, i.e., lower quality, a vehicle has an increased risk of generating multiple hit points at the same time. That is, the DFOS data indicates that the same vehicle is at two different locations at the same time. By de-noising the DFOS data, the multiple hit points for a single vehicle are able to be removed or combined in order to provide usable data.

In addition to a situation where a single vehicle generates multiple hit points at a same time, the DFOS data also includes erroneous non-vehicle data in some instances. For example, if there is construction adjacent to a roadway, a strong wind causes a bridge to vibrate, or a vehicle passing underneath an overpass causes the overpass to vibrate, the DFOS data has an increased likelihood of generating a hit point. Filtering out these erroneous hit points helps to improve the precision of the data in order to allow the DFOS data to be usable for traffic monitoring, autonomous driving, navigation instructions, or other suitable applications.

FIG. 1A is a schematic view of a distributed acoustic sensor (DAS) system 100A along a roadway 130A in accordance with some embodiments. DAS system 100A includes a traffic monitoring apparatus 111 in communication with a DAS 112. DAS system 100A further includes an optical fiber 121 connected to DAS 112. Optical fiber 121 is along roadway 130A. Roadway 130A includes three lanes. Numerous vehicles are on roadway 130A. Some vehicles 140 on roadway 130A are larger than other vehicles 150 on roadway 130A. While the description refers to an optical fiber 121, one of ordinary skill in the art would understand that the optical fiber 121 includes a multi-fiber bundle in some embodiments.

As vehicles 140 and 150 pass along roadway 130A the vehicles generate vibrations. These vibrations change a manner in which light propagates along optical fiber 121. DAS 112 is connected to optical fiber 121 and sends an optical signal down optical fiber 121 and detects the returned light from optical fiber 121. The resulting data is called waterfall data. The waterfall data provides information related to a number of vehicles, directionality of travel by the vehicles, vehicle speed and lane location of the vehicles on roadway 130A.

Figure 1B:
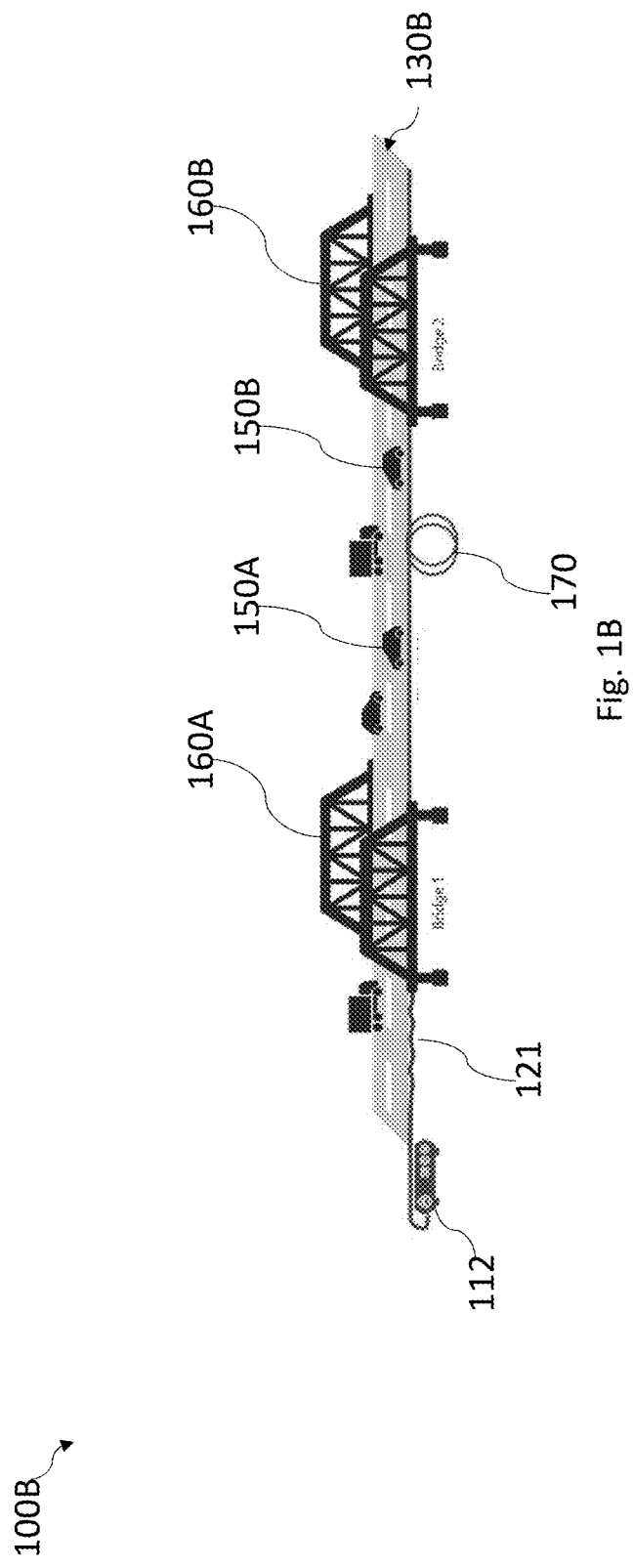
FIG. 1B is a schematic view of a distributed acoustic sensor (DAS) system along a roadway in accordance with some embodiments.

Roadway 130A in FIG. 1 is on solid ground. Solid ground does not vibrate at a sufficiently high amplitude to obscure detection of vehicles 140 and 150 on traveling along roadway 130A. As a result, DAS 112 is able to precisely detect vehicles 140 and 150 traveling along roadway 130A. In some embodiments, roadway 130A includes at least one bridge, such as roadway 130B in FIG. 1B.

Unlike solid ground, bridges exhibit different vibration characteristics, such as dampening. The vibration characteristics of bridges are impacted by bridge length, construction material of the bridge, wind and other factors. These differences in vibration characteristics of bridges are able to be utilized to determine where along the optical fiber 121 bridges are located.

FIG. 1A also includes exemplary measured DAS data. This exemplary measured DAS data is provided to assist in the understanding of waterfall data collected by DAS 112.

FIG. 1B is a schematic view of a DAS system 100B along a roadway 130B in accordance with some embodiments. Similar to the DAS system 100A in FIG. 1A, the DAS system 100B includes DAS 112 and optical fiber 121. In contrast to FIG. 1A, the roadway 130B in FIG. 1B includes a first bridge 160A and a second bridge 160B. Additionally, the FIG. 1B includes extra fiber portion 170.

Considering a first vehicle 150A and a second vehicle 150B helps in understanding the use of fixed reference points, such as the first bridge 160A and the second bridge 160B in precisely determining locations corresponding to traffic information. A distance between the first vehicle 150A and the second vehicle 150B along the roadway 130B is significantly different than a length of the optical fiber 121 between the location of the first vehicle 150A and the second vehicle 150B. This difference is due to the presence of extra fiber portion 170, as well as optical fiber 121 not being exactly parallel to the roadway 130B. Determining a location of the first bridge 160A along the optical fiber 121 helps to determine a precise location of the first vehicle 150A along the roadway 130B. A location of the first bridge 160A along the roadway 130B is known based on publicly available geographic data. By determining the position of the first bridge 160A relative to the optical fiber 121, a length of the optical fiber 121 from the DAS 112 to an end of the first bridge 160A closest to the first vehicle 150A is determined based on the waterfall data. Next, a length of the optical fiber 121 between the end of the first bridge 160A to the first vehicle 150A is determined based on the waterfall data. By limiting a distance of the optical fiber 121 from the fixed reference point of the first bridge 160A to the first vehicle 150A, errors between the length of the roadway 130 from the end of the first bridge 160A to the DAS 112 are excluded from the location determination. As a result, the location of the first vehicle 150A along the roadway 130B is able to be more precisely determined using the fixed reference point of the first bridge 160A.

Similarly, the location of the second vehicle 150B is more precisely determined by using the fixed reference point of the second bridge 160B. The waterfall data from DAS 112 is usable to determine the length of the optical fiber 121 between the DAS 112 an end of the second bridge 160B closest to the second vehicle 150B. Then, only the length of optical fiber 121 between the second vehicle 150B and the second bridge 160B is used to determine the location of the second vehicle 150B along the roadway 130B. Using this shorter length of optical fiber 121 excludes the length of the optical fiber 121 between the second vehicle 150B and the DAS 112, including the extra fiber portion 170, from the location determination. As a result, the location of the second vehicle 150B is more precisely determined by using the fixed reference point of the second bridge 160B.

Figure 2:
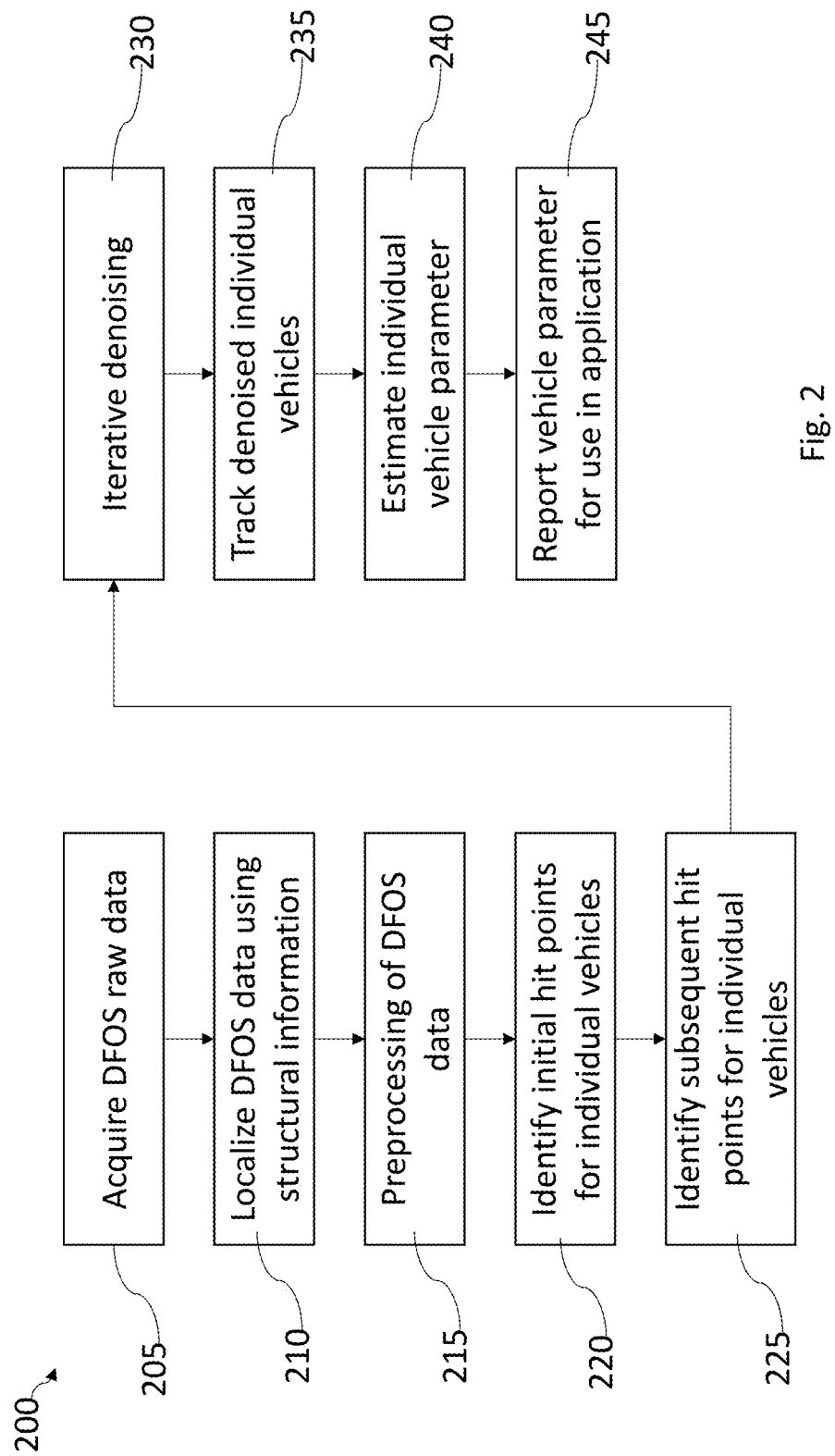
FIG. 2 is a flowchart of a method of analyzing data from distributed fiber optic sensing (DFOS) data in accordance with some embodiments.

FIG. 2 is a flowchart of a method of analyzing data from distributed fiber optic sensing (DFOS) data in accordance with some embodiments. The method 200 is usable with the DAS system 100A (FIG. 1A), the DAS system 100B (FIG. 1B), or another suitable system that provides DFOS data.

In operation 205, raw DFOS data is received. In some embodiments, the raw DFOS data includes waterfall data, e.g., waterfall data detected by DAS 112 (FIG. 1). Waterfall data includes information related to time and location along the optical fiber at which vibration data is detected. Further details of the waterfall data are discussed with respect to FIG. 3 below. In some embodiments, the waterfall data includes data along a roadway including both solid ground and at least one bridge.

In operation 210, the raw DFOS data is localized using structural information. The structural information includes information obtained from an external source with respect to fix reference points along the roadway. For example, in some embodiments, the structural information includes a location of a bridge, e.g., bridge 160A (FIG. 1B), a location of extra fiber, e.g., extra fiber 170 (FIG. 1B), or other suitable reference points along the roadway. Localizing the DFOS data using structural information helps to improve the accuracy and precision of the position of a detected vehicle as well as accurate determination of vehicle parameters, such as speed, acceleration, etc. The localization of the DFOS data also helps to improve accuracy and precision of navigation instructions, autonomous driving functionality, traffic monitoring, or other suitable applications of the DFOS data.

In operation 215, the raw DFOS data is preprocessed in order to enhance the received data. Preprocessing the data includes normalizing vibration amplitude of the data at each position along a roadway, e.g., roadway 130B (FIG. 1B), across a predetermined time duration. Normalizing the vibration amplitude helps to account for variations in sensitivity of the optical fiber. Variations in sensitivity of the optical fiber comes from several sources including, but not limited to, uneven surfaces of the roadway, inconsistent installation of the optical fiber, and inconsistencies in the optical fiber. Normalizing the vibration amplitude also helps to account for variations in traffic volume. For example, as a number of vehicles on the roadway increases, a magnitude of vibrations detected by the DAS will increase. By normalizing the vibration amplitude based on a predetermined time duration, an effect of the large magnitude vibrations detected during high traffic conditions on time periods with low traffic conditions is reduced producing more precise data for estimating traffic flow properties.

In some embodiments, preprocessing the data also limits a maximum vibration amplitude at each position along the optical fiber for the predetermined time duration. Limiting the maximum vibration amplitude helps to prevent vibrations from large vehicles, such as trucks or construction vehicles, from obscuring vibrations generated by smaller vehicles, such as passenger automobiles.

Figure 4:
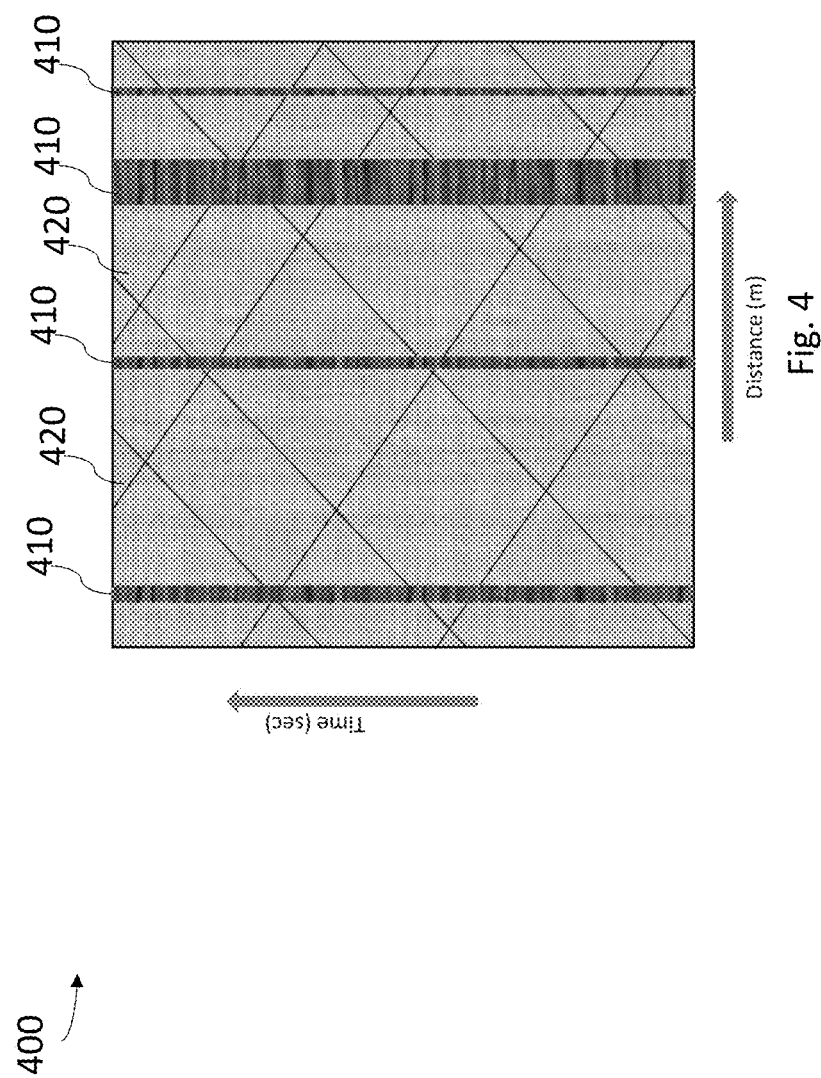
FIG. 4 is a view filtered DFOS data in accordance with some embodiments.

The preprocessed data is then filtered by a band pass filter based on the estimated frequency range from operation 210. Filtering of the data excludes portions of the roadway from the data that fail to exhibit the vibration dampening characteristics of bridges. FIG. 4 below provides an example of filtered DFOS data.

In operation 220, initial hit points are identified for individual vehicles. The hit points are identified at a first time, e.g., time (t)=0. In some embodiments, the first time is the time at which the vehicle first enters a detection area for the DAS system, e.g., DAS system 100A (FIG. 1A), DAS system 100B (FIG. 1B), or another suitable DAS system. In some embodiments, the first time is a time selected by a user of the DAS system. The hit points are identified based on detected vibrations in the DFOS data. The detected vibrations are determined based on a width of a line in the DFOS data. In some instances, the vibrations generate a wider, indicating higher vibration intensity. The wider line has an increased risk of resulting in multiple hit points being identified for a same vehicle. Additionally, in some embodiments, additional vibrations not caused by a vehicle traveling along the roadway will generate vibrations detected in the DFOS data. These additional vibrations potentially result in erroneous hit points being identified where no vehicle exists.

In some embodiments, a trained neural network (NN) is utilized to identify the hit points within the DFOS data. In some embodiments, the hit points are identified or verified by a user of the DAS system. The identification of the initial hit points assists with tracking of a vehicle through at least a portion of a detection area of the DAS system in order to determine vehicle parameters for use in autonomous driving, navigation instructions, traffic monitoring or other suitable applications. Additional details with respect to detecting initial hit points are provided with respect to FIG. 5 below, in accordance with some embodiments.

In operation 225, subsequent hit points are identified for individual vehicles. The subsequent hit points are vehicle locations determined using the DFOS data at times after the first time, e.g., t=1, t=2, etc. In some embodiments, an interval between the first time and the subsequent times is uniform across each of the times. In some embodiments, an irregular interval exists between the first time and the subsequent times. In some embodiments, the interval is predetermined. In some embodiments, the interval is set based on a speed limit along the roadway. In some embodiments, the interval is set based on expected traffic along the roadway, e.g., shorter intervals for higher traffic congestion areas. In some embodiments, the subsequent hit points are identified in a same manner as the initial hit point. In some embodiments, in addition to detecting vibrations based on the DFOS data the subsequent hit points are identified based on a number of initial hit points, which are usable to predict a number of vehicles to be tracked through the detection area of the DAS system. In some embodiments, in addition to detecting vibrations based on the DFOS data the subsequent hit points are identified based on an expected location of the vehicle. In some embodiments, a trained NN is usable to identify the subsequent hit points. Additional details with respect to detecting initial hit points are provided with respect to FIG. 6 below, in accordance with some embodiments.

In operation 230, iterative de-noising is applied to the hit points. The iterative de-noising is applied to the initial hit point and the subsequent hit points for each vehicle detected using the DFOS data. The iterative de-noising seeks to remove hit points that are erroneous either from vibrations generated by sources other than vehicles or erroneous due to multiple hit points being generated for a same vehicle for a same time.

The iterative de-noising includes classifying clusters of hit points as either a good cluster or a bad cluster. As noted above, the identification of subsequent hit points in operation 225 is able to be performed in part based on the number of initial hit points. Thus, the grouping of hit points into clusters for classification is possible based on the initial number of hit points and the expected movement of the vehicle. Each cluster represents a vehicle traveling through the detection area of the DAS system. In some embodiments, the cluster of hit points is performed using a trained NN. In some embodiments, the clustering is performed using K-means clustering, density-based spatial clustering of applications with noise (DBSCAN) clustering, Gaussian Mixture Model clustering, balanced iterative reducing and clustering using hierarchies (BIRCH) clustering, affinity propagation clustering, mean-shift clustering, ordering points to identify the clustering structure (OPTICS) clustering, agglomerative hierarchy clustering, or another suitable type of clustering.

In some embodiments, a good cluster is a set of hit points associated with a same vehicle which has a single hit point for each time. In some embodiments, a bad cluster is a set of hit points associated with a same vehicle which has multiple hit points or no hit points for at least one time. In some embodiments, thresholding is utilized to classify clusters as either a good cluster or a bad cluster. In some embodiments, the thresholding is performed based on a number of detection times. For example, in a situation where there are six detection times, e.g., t=0 through t=5, thresholding is applied based on a selected percentage of hit points for a vehicle across the detection times. That is, in some embodiments, the threshold value is the selected percentage multiplied by the number of detection times. For example, a selected percentage of 75% and a number of detection times being 6 would yield a threshold of 4.5. i.e., (0.75)(6). Using this threshold any cluster with more than or equal to 4.5 hit points would be considered a good cluster and any cluster with less than 4.5 hit points would be considered a bad cluster. In some embodiments, the selected percentage is a predetermined value set by a user or based on empirical data.

In some embodiments, the selected percentage is adjusted based on noise in the DFOS data. For example, in a situation where construction is occurring or on a day with strong wind the selected percentage is reduced to account for the increase in noise that will be present in the DFOS data. In some embodiments, the selected percentage is determined based on a trained NN. In some embodiments, the selected percentage ranges from about 65% to about 85%. If the selected percentage is too small, then clusters that include noisy data are more likely to be included in the vehicle parameter estimation of operation 240 and the data utilized in operation 245 will be less reliable, in some instances. If the selected percentage is too large, then the de-noising will exclude too much data and the data utilized in operation 245 will be less robust reducing the impact of the method 200, in some instances.

Once the classification of the clusters is completed, then good clusters are considered as a reliable indicator of the position of a single vehicle at various times in the detection area of the DAS system. In order to improve the completeness of the analysis and maximize the value of the DFOS data, bad clusters are analyzed to attempt to reconcile hit points to condense one or more bad clusters into a good cluster.

For each bad cluster, an initial noisy hit point is identified. In some embodiments, the initial noisy hit point is identified as a hit point at the first time, or at an earliest time that the cluster is detected. The initial noisy hit point is then removed from consideration and the clustering and classification is repeated. During the clustering and classification, the number of detection times is reduced by one since the initial noisy hit point was removed for each bad cluster. In some situation the result of the repeated clustering and classification results in a combination of one or more bad clusters into a good cluster. That is, a noisy hit point caused the clustering algorithm to detect more vehicles than actually existed along the roadway, so once the noisy hit point was removed the clustering properly recognizes the correct number of vehicles traveling along the roadway.

The removal of the initial noisy hit point, clustering and classifying is repeated in an iterative manner until all remaining clusters are deemed to be good clusters. For each iteration of the process, the detection times are further reduced by one since an additional detected hit point for each bad cluster is removed in each iteration. Additional details with respect to detecting initial hit points are provided with respect to FIGS. 6 and 7 below, in accordance with some embodiments.

In operation 235, the de-noised individual vehicles are tracked. The tracking of the individual vehicles is performed using the good clusters remaining following the operation 230. Each good cluster corresponds to the movement of a single vehicle through the detection area of the DAS system. The tracking of the individual vehicles determines the location of the vehicle at each detection time.

In operation 240, an individual vehicle parameter is estimated. The estimating of the vehicle parameter is determined by the tracking of individual vehicles within the detection area of the DAS system. In some embodiments, the vehicle parameter includes speed, acceleration, lane position, or another suitable parameter. In some embodiments, the vehicle parameter is estimated by generating a regression line for the hit points in the cluster. In some embodiments, the regression line is generated using linear regression, polynomial regression, Lasso regression, or another suitable regression model. A speed of the vehicle is able to be estimated by a slope of the regression line. A flatter slope indicates a higher speed than a more vertical slope. An acceleration of the vehicle is able to be estimated based on a change in slope of the regression line. Stopping of the vehicle is able to be estimated based on failure to detect additional hit points at expected locations over one or more detection time intervals. Lane changing of the vehicle is able to be estimated by a shift of the regression line along the x-axis indicating that the vehicle is closer to or farther from the optical fiber. One of ordinary skill in the art would recognize that the above descriptions of vehicle parameters and methods of estimating the vehicle parameters is not exhaustive and does not limit the scope of this description. One of ordinary skill in the art would be able to determine additional vehicle parameters or utilize other options for determining vehicle parameters based on the tracked individual vehicles. Additional details with respect to detecting initial hit points are provided with respect to FIGS. 8A and 8B below, in accordance with some embodiments.

In operation 245, the vehicle parameter is reported for use in one or more application. In some embodiments, the application includes navigation instructions, autonomous driving, traffic monitoring or other suitable applications. In some embodiments, the vehicle parameter is reported by transmitting the vehicle parameter to an external device, such as a server, the vehicle, a mobile device, or another suitable system. In some embodiments, the report is transmitted via a wired connection. In some embodiments, the report is transmitted wirelessly, e.g., using a cellular network, a local area network, or another suitable network.

In some embodiments, the method 200 includes additional operations. For example, in some embodiments, the method 200 includes generating instructions for controlling an autonomously driven vehicle based on the estimated vehicle parameter. In some embodiments, at least one operation of the method 200 is omitted. For example, in some embodiments, the operation 235 is omitted and the tracking of the vehicle and the estimating of the vehicle parameter are performed simultaneously. In some embodiments, an order of operations of the method 200 is adjusted. For example, in some embodiments, the operation 215 is performed prior to the operation 210.

Using the method 200, the DFOS data is usable to determine the performance of a vehicle along a roadway with increased accuracy and precision in comparison with other approaches that fail to iteratively cluster and classify hit points. The improved determination of vehicle performance helps to improve the accuracy of traffic monitoring, navigation instructions, autonomous driving instructions and other applications.

Figure 3:
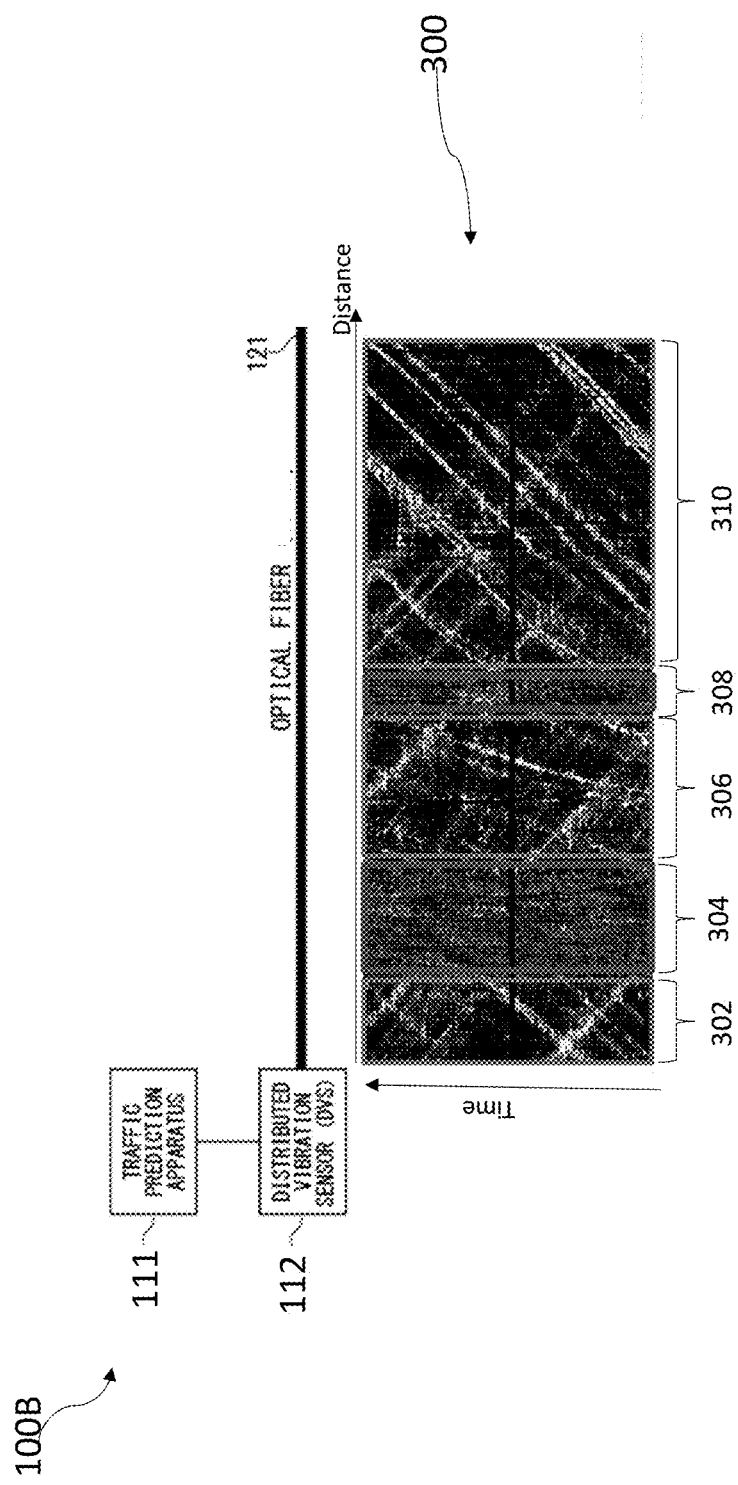
FIG. 3 is a schematic view of a DAS system along with waterfall data collected by the DAS system in accordance with some embodiments.

FIG. 3 is a schematic view of a DAS system 100B along with waterfall data 300 collected by the DAS system in accordance with some embodiments. DAS system 100B is the same as DAS system 100B in FIG. 1B. Similar to FIG. 1B, the roadway (not shown) in FIG. 3 includes two bridges, as indicated by waterfall data 300. Waterfall data 300 is preprocessed waterfall data.

Waterfall data 300 includes regions 302, 304, 306, 308 and 310. Regions 302, 306 and 310 include discernable lines indicating vibrations produced by vehicles traversing the roadway. Regions 304 and 308 indicate bridges. In comparison with regions 302, 306 and 310, regions 304 and 308 include no discernable lines because the dampening vibrations of the bridge obscure the detected vibrations of vehicles traversing the bridge.

FIG. 4 is a view of filtered DFOS data 400 in accordance with some embodiments. The filtered DFOS data 400 includes regions 410 that indicate higher vibration intensities within the estimate frequency range. The regions 410 are likely to be bridges along the roadway. The filtered DFOS data 400 also includes regions 420 that indicate lower vibration intensities within the estimated frequency range. The regions 420 are likely to be non-bridge portions of the roadway.

Figure 5:
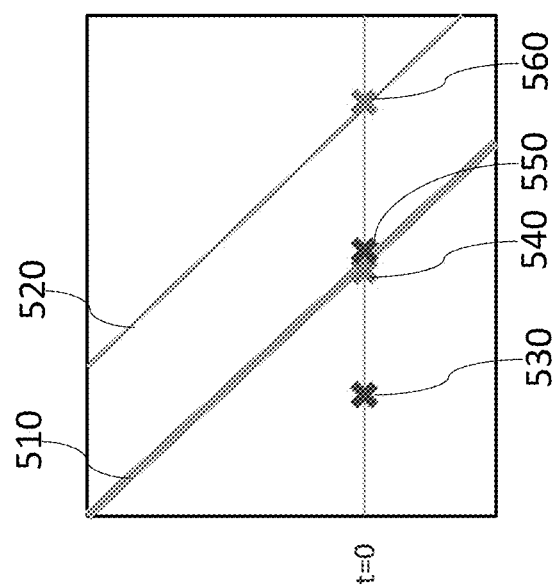
FIG. 5 is a view of a plot of detected vehicle positions based on DFOS data in accordance with some embodiments.

FIG. 5 is a view of a plot 500 of detected vehicle positions based on DFOS data in accordance with some embodiments. In some embodiments, the plot 500 is generated during operation 220 (FIG. 2). In some embodiments, the plot 500 is generated by another method. In some embodiments, the plot 500 is generated by a system 1000 (FIG. 10), a trained NN or another suitable system.

The plot 500 includes a first vibration line 510 and a second vibration line 520. The plot 500 further includes an initial time, also called a first time, t=0. The plot 500 further includes a plurality of hit points at the time t=0. A hit point 530 is not located at either of the first vibration line 510 or the second vibration line 520. A hit point 540 is at an intersection of a first side of the first vibration line 510 and the t=0 line. A hit point 550 is at an intersection of a second side of the first vibration line 510 and the t=0 line. A hit point 560 is at an intersection of the second vibration line 520 and the t=0 line.

The first vibration line 510 is thicker than the second vibration line 520. The increased thickness of the first vibration line 510 relative to the second vibration line 520 indicates that a vehicle that generated the first vibration line 510 caused higher amplitude in vibration than a vehicle that generated the second vibration line 520. Potential reasons for the increased thickness include a heavier vehicle, a longer vehicle, and differences in different lanes of a roadway. One of ordinary skill in the art would recognize that these potential reasons are not exhaustive or limiting on this description, but merely provide context for understanding this description. The increased thickness of the first vibration line 510 causes two hit points 540 and 550 to be associated with this line. One of these hit points 540 or 550 is likely to be an erroneous or noisy hit point to be removed in a de-noising process as discussed above and further discussed below with respect to FIG. 7, in accordance with some embodiments.

The hit point 530 is not associated with any vibration line. Thus, the hit point 530 is likely to be a noisy hit point. Potential reasons for the hit point 530 include construction near the roadway, a strong wind, or erroneous data. One of ordinary skill in the art would recognize that these potential reasons are not exhaustive or limiting on this description, but merely provide context for understanding this description.

The hit point 540 is on a first side of the first vibration line 510; and the hit point 550 is on a second side of the first vibration line 510. The thickness of the first vibration line 510 caused a system, such as system 1000 (FIG. 10), a trained NN, or another suitable system, to identify two different hit points associated with the first vibration line 510.

The hit point 550 is on the second vibration line 520. Since the second vibration line 520 is sufficiently thin, only a singe hit point was generated by the system based on the second vibration line 520.

Figure 6:
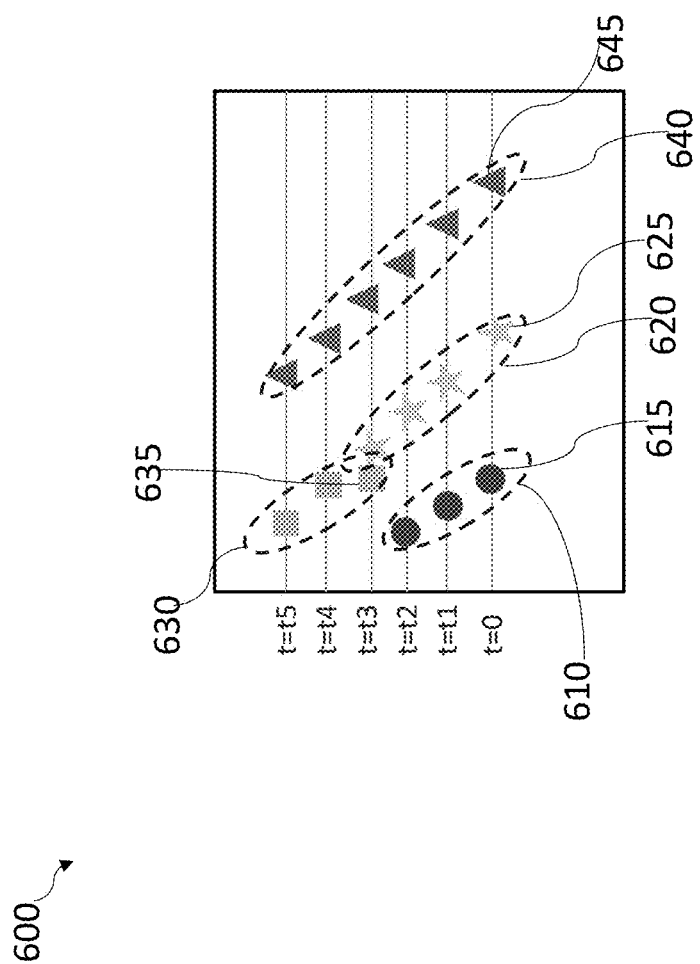
FIG. 6 is a view of a plot of detected vehicle positions based on DFOS data in accordance with some embodiments.

FIG. 6 is a view of a plot 600 of detected vehicle positions based on DFOS data in accordance with some embodiments. In some embodiments, the plot 500 is generated during operations 225 and 230 (FIG. 2). In some embodiments, the plot 500 is generated by another method. In some embodiments, the plot 500 is generated by a system 1000 (FIG. 10), a trained NN or another suitable system.

In comparison with the plot 500 (FIG. 5), the plot 600 includes hit points at multiple times, i.e., t=0 to t=5. The plot 600 includes a plurality of clusters of hit points. A first cluster 610 includes an initial hit point 615 at the time t=0. A second cluster 620 includes an initial hit point 625 at time t=0. A third cluster 630 includes an initial hit point 635 at time t=3. A fourth cluster 640 includes an initial hit point 645 at time t=0. Each of the clusters 610, 620, 630 and 640 is a group of hit points that are clustered together using a clustering algorithm, such as that described above. The following description is based on an example of the implementation of operation 230 (FIG. 2) including a selected percentage of 75%. One of ordinary skill in the art would understand that these selected percentage is merely exemplary and that other selected percentages are within the scope of this description. Further, as noted above, this description is not limited to the use of thresholds in classifying clusters as good clusters and bad clusters.

The first cluster 610 includes three hit points including the initial hit point 610. Since there are six detection times and the selected percentage for this example is set at 75%, the threshold of hit points for a good cluster is 4.5. Since the first cluster 610 has fewer than 4.5 hit points, the first cluster 610 will be classified as a bad cluster.

The second cluster 620 includes four hit points including the initial hit point 625. As noted above, the threshold of hit points for a good cluster is 4.5. Since the second cluster 620 has fewer than 4.5 hit points, the second cluster 620 will be classified as a bad cluster.

The third cluster 630 includes three hit points including the initial hit point 635. As noted above, the threshold of hit points for a good cluster is 4.5. Since the third cluster 630 has fewer than 4.5 hit points, the third cluster 630 will be classified as a bad cluster.

The fourth cluster 640 includes six hit points including the initial hit point 645. As noted above, the threshold of hit points for a good cluster is 4.5. Since the fourth cluster 640 has more than 4.5 hit points, the fourth cluster 640 will be classified as a good cluster.

Based on the initial classification of the clusters, the fourth cluster 640 is deemed to be a good cluster and analysis of the fourth cluster for de-noising purposes ends. The remaining clusters 610, 620 and 630 continue the iterative de-noising process of removal of an initial hit point, clustering and classification.

In the next iteration, the initial hit point 615 is removed from the first cluster 610, the initial hit point 625 is removed from the second cluster 620, and the initial hit point 635 is removed from the third cluster 630. The remaining hit points are then subjected to another clustering process using a clustering algorithm, such as that described above. As a result of the removal of the initial hit points, the first cluster 610 will be reduced to a cluster including two hit points, i.e., at times t=1 and t=2. However, the removal of the initial hit point 635 will cause the remaining hit points of the third cluster 630 to be clustered with the hit points of the second cluster 620 other than initial hit point 625, which was removed. As a result, only two clusters will remain following this iteration of clustering, the reduced first cluster 610 and the combined cluster of the remaining hit points of the second and third clusters 620 and 630. The classification of the remaining clusters would compare the hit points in each cluster to a threshold of 4, because the number of detection times is reduced from 6 to 5. The reduced number of detection times is multiplied by the selected percentage of 75%. The reduced first cluster would have two hit points, which is less than four and continue to be classified as a bad cluster. However, the combined cluster of the remaining hit points of the second and third clusters would have five hit points, which is greater than 4. Therefore, the combined cluster of the remaining hit points of the second and third clusters would be classified as a single good cluster. De-noising would now cease with respect to the combined cluster of the remaining hit points of the second and third clusters.

The reduced first cluster would undergo another iteration of removal of the initial hit point, clustering and classification. The result would be that the single remaining hit point of the first cluster is less than a threshold number of 3, 75% of the 4 detection times for this iteration. Again, the further reduced first cluster would still be classified as a bad cluster. During the next iteration, all hit points from the first cluster 610 will have been removed. As a result, the first cluster 610 is entirely discarded.

Turning back to the combined cluster of the remaining hit points of the second and third clusters, the resulting good cluster from the de-noising process would include all of the hit points of the second cluster 620, including the initial hit point 625, and all of the hit points of the third cluster 630 except the initial hit point 635. The reason for the inclusion of the initial hit point 625 instead of the initial hit point 635 is because each good cluster should have a single hit point at each detection time. The initial hit point 635 is at a same detection time as a hit point in the second cluster 620. Therefore, the initial hit point 635 is discarded from the good cluster resulting from the iterative de-noising process.

Figure 7:
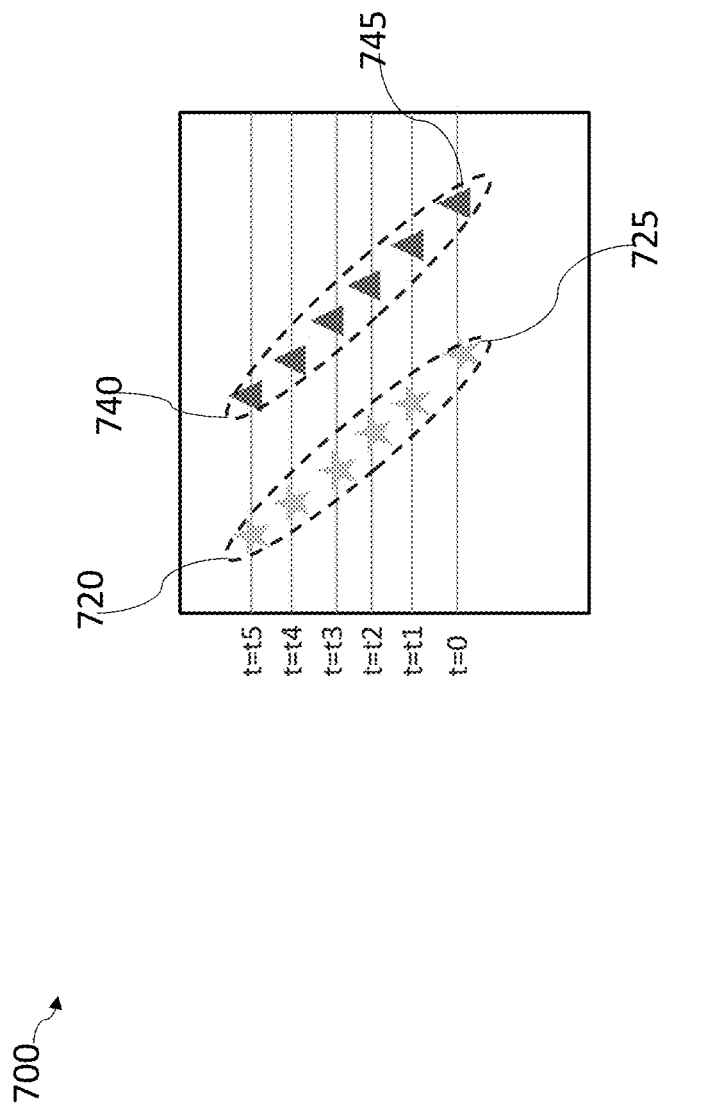
FIG. 7 is a view of a plot of de-noised vehicle positions based on DFOS data in accordance with some embodiments.

FIG. 7 is a view of a plot 700 of de-noised vehicle positions based on DFOS data in accordance with some embodiments. In some embodiments, the plot 700 is generated during operation 230 (FIG. 2). In some embodiments, the plot 700 is generated by another method. In some embodiments, the plot 700 is generated by a system 1000 (FIG. 10), a trained NN or another suitable system. In some embodiments, the plot 700 is a resulting plot from the iterative de-noising process described above with respect to FIG. 6.

Similar to plot 600 (FIG. 6), plot 700 includes six detection times. The plot 700 includes only good clusters because the plot 700 is a resulting plot following the iterative de-noising process. The plot 700 includes a first good cluster 720, which corresponds to the combined cluster of the second cluster 620 and the third cluster 630 discussed in the description of plot 600 (FIG. 6). The first good cluster 720 includes an initial hit point 725, which corresponds to the initial hit point 625 (FIG. 6). The plot 700 includes a second good cluster 740, which corresponds to the fourth cluster 640 discussed in the description of plot 600 (FIG. 6). The second good cluster 740 includes an initial hit point 745, which corresponds to the initial hit point 645 (FIG. 6).

FIG. 8A is a view of a plot 800A for determining a vehicle parameter in accordance with some embodiments. The plot 800A is a result of an iterative de-noising process of DFOS data. In some embodiments, the plot 800A is generated during the operation 240 (FIG. 2). In some embodiments, the plot 800A is generated during another method. In some embodiments, the plot 800A is generated by a system 1000 (FIG. 1), a trained NN or another suitable system. In some embodiments, the plot 800A is a result of continued tracking of the vehicles associated with the good clusters in the plot 700 (FIG. 7).

The plot 800A includes a first regression line 810 extending through hit points 815 of a first cluster. The first regression line 810 has a first slope 820. The plot 800A includes a second regression line 830 extending through hit points 835 of a second cluster. The second regression line 830 has a second slope 840.

As noted in FIG. 4 above, the DFOS data has distance along the x-axis of the plot. Thus, the slope of the regression lines is usable to determine the speed of the vehicle associated with each of the clusters. The first slope 820 is usable to determine a first speed of a vehicle associated with the first cluster. The second slope 840 is usable to determine a second speed of a vehicle associated with the second cluster. The second slope 640 is slightly steeper than the first slope 620. This indicates that the second vehicle is traveling at an average speed slower than the first vehicle.

While the plot 800A provides an example of determining speed as a vehicle parameter, one of ordinary skill in the art would understand that this application is not limited to determination of speed. One of ordinary skill in the art would understand that a change in the slope of a regression line within a same cluster would be usable to determine a change in speed, i.e., acceleration of the corresponding vehicle. Similarly, a sharp shift along the x-axis would indicate that a distance between the vehicle and the detector suddenly changed, which potentially indicates a change of lanes by the vehicle.

Figure 8B:
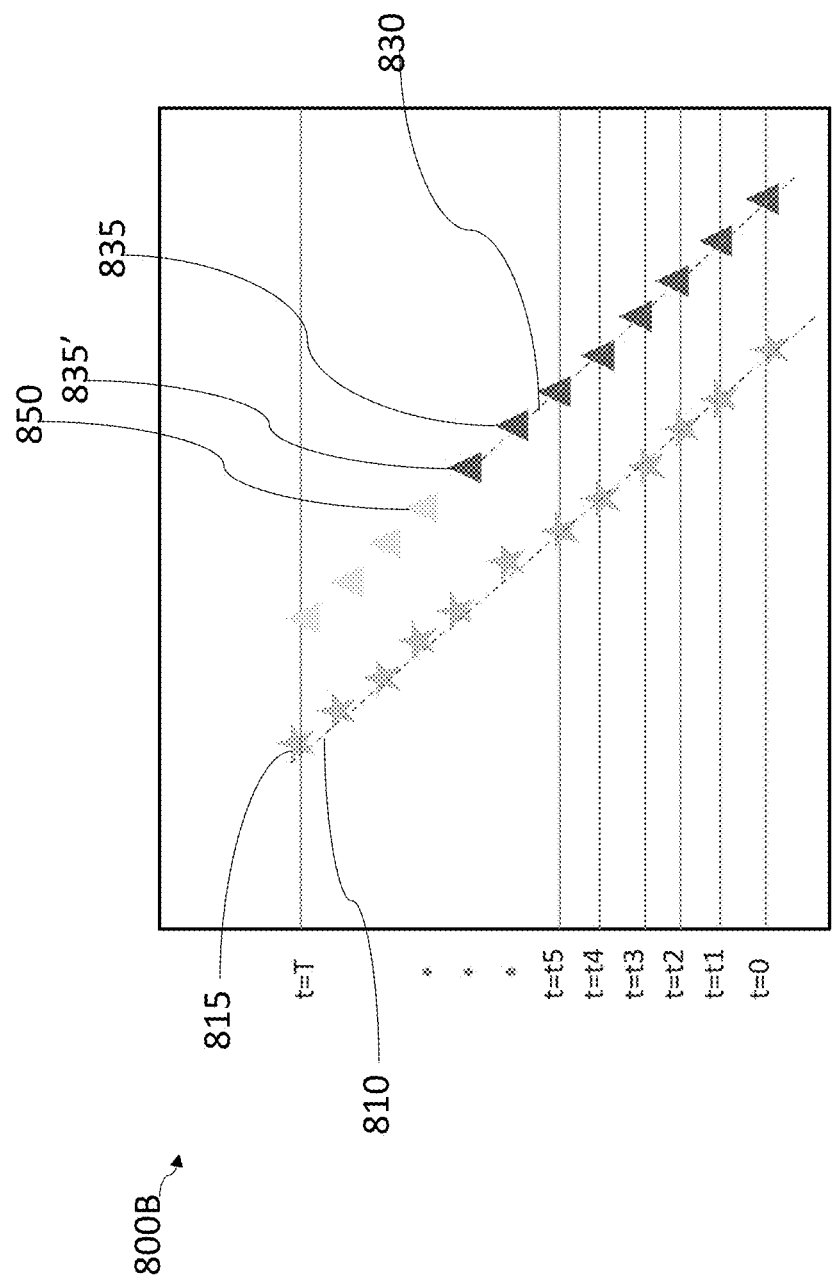
FIG. 8B is a view of a plot for determining a vehicle parameter in accordance with some embodiments.

FIG. 8B is a view of a plot for determining a vehicle parameter in accordance with some embodiments. The plot 800B is a result of an iterative de-noising process of DFOS data. In some embodiments, the plot 800B is generated during the operation 240 (FIG. 2). In some embodiments, the plot 800B is generated during another method. In some embodiments, the plot 800B is generated by a system 1000 (FIG. 1), a trained NN or another suitable system. In some embodiments, the plot 800B is a result of continued tracking of the vehicles associated with the good clusters in the plot 700 (FIG. 7).

The plot 800B includes a first regression line 810 extending through hit points 815 of a first cluster. The plot 800B includes a second regression line 830 extending through hit points 835 of a second cluster. In contrast with the plot 800A (FIG. 8A), the plot 800B does not include hit points later than hit point 835'. The failure to detect hit points at expected locations 850 indicates an anomaly has occurred. In some instances, the failure to detect hit points after the hit point 835' indicates that the vehicle stopped and is no longer moving along the roadway. For example, the vehicle is stuck in traffic congestion. In some instances, the failure to detect hit points after the hit point 835' indicates that the vehicle exited the roadway, e.g., using an exit ramp. In some embodiments, a comparison between structural features of the roadway, such as in operation 210 (FIG. 2), is usable to determine whether an exit ramp is located near the hit point 835'. The presence of an exit ramp near the hit point 835' would suggest the vehicle exited the roadway. In comparison, the lack of an exit ramp near the hit point 835' would suggest that the vehicle stopped along the roadway. Utilizing a combination of structural information of the roadway in combination of the DFOS data would allow a system, such as system 1000 (FIG. 10), a trained NN, or another suitable system, to accurately determine a cause of the anomaly.

Figure 9:
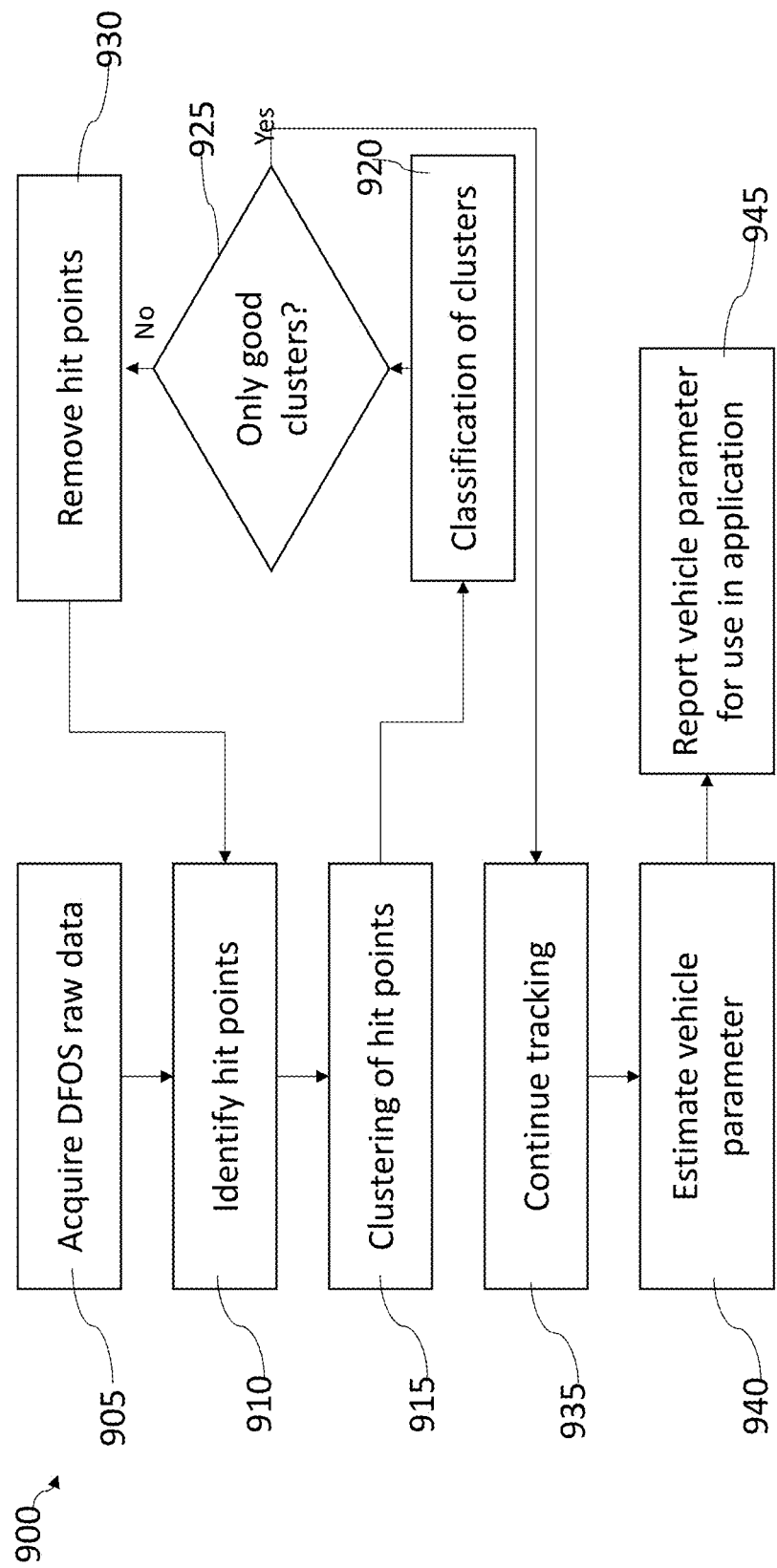
FIG. 9 is a flowchart of a method of de-noising data from distributed fiber optic sensing (DFOS) data in accordance with some embodiments.

FIG. 9 is a flowchart of a method 900 of de-noising data from distributed fiber optic sensing (DFOS) data in accordance with some embodiments. The method 200 is usable with the DAS system 100A (FIG. 1A), the DAS system 100B (FIG. 1B), or another suitable system that provides DFOS data. Some of the operations of the method 900 are similar to operations of the method 200 (FIG. 2) and are not discussed in detail for the sake of brevity.

In operation 905, raw DFOS data is acquired. In some embodiments, the operation 905 is similar to the operation 205 (FIG. 2).

In operation 910, hit points are identified in the DFOS data. In some embodiments, the operation 910 is similar to the operations 220 and 225 (FIG. 2).

In operation 915, the hit points are clustered. In some embodiments, the hit points are clustered using K-means clustering, where a number of initial hit points determined in operation 910 is used as the value for K. In some embodiments, the cluster is performed using an algorithm other than K-means clustering, such as the clustering algorithms above.

In operation 920, the clusters are classified. The clusters are classified into good clusters and bad clusters. In some embodiments, the classification of the cluster is similar to the classification discussed above with respect to the operation 230 (FIG. 2).

In operation 925, a determination is made regarding whether only good clusters are present. In response to a determination that only good clusters remain, the method 900 proceeds to operation 935. In response to a determination that at least one bad cluster remains, the method 900 proceeds to operation 930.

In operation 930, hit points are removed from each of the clusters. In a first iteration of the loop of operations 910, 915, 920 and 925, the initial hit point for each cluster is removed. In subsequent iterations of the loop of operations 910, 915, 920 and 925, an earliest remaining hit point is removed from each cluster. In some embodiments, the removal of the hit points is similar to the removal discussed above with respect to the operation 230 (FIG. 2), or with respect to the plot 600 (FIG. 6).

The loop of operations 910, 915, 920, 925 and 930 repeats until only good clusters remain; or until all hit points have been removed.

In operation 935, the vehicles associated with the good clusters are tracked. In some embodiments, the operation 935 is similar to the operation 235 (FIG. 2).

In operation 940, a vehicle parameter is estimated. In some embodiments, the operation 940 is similar to the operation 240 (FIG. 2).

In operation 945, the vehicle parameter is reported for use in an application. In some embodiments, the operation 945 is similar to the operation 245 (FIG. 2).

In some embodiments, the method 900 includes additional operations. For example, in some embodiments, the method 900 includes generating instructions for controlling an autonomously driven vehicle based on the estimated vehicle parameter. In some embodiments, at least one operation of the method 900 is omitted. For example, in some embodiments, the operation 935 is omitted and the tracking of the vehicle and the estimating of the vehicle parameter are performed simultaneously. In some embodiments, an order of operations of the method 900 is adjusted. For example, in some embodiments, the operation 945 is performed simultaneously with the operation 940.

Using the method 900, the DFOS data is usable to determine the performance of a vehicle along a roadway with increased accuracy and precision in comparison with other approaches that fail to iteratively cluster and classify hit points. The improved determination of vehicle performance helps to improve the accuracy of traffic monitoring, navigation instructions, autonomous driving instructions and other applications.

Figure 10:
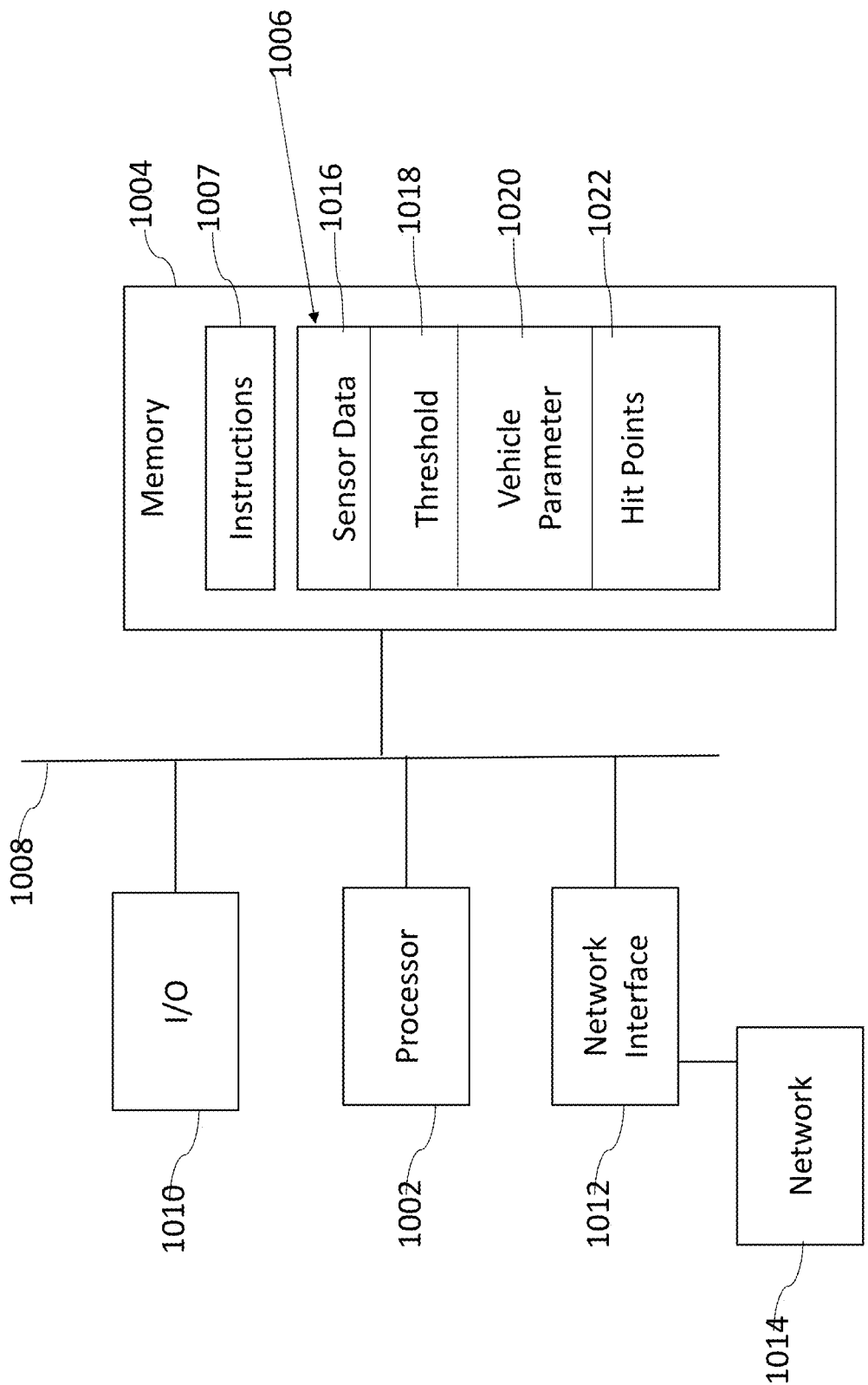
FIG. 10 is a block diagram of a system for analyzing DFOS data in accordance with some embodiments.

FIG. 10 is a block diagram of a system 1000 for analyzing DFOS data in accordance with some embodiments. System 1000 includes a hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with external devices. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system 100 to be usable for performing a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 1000 to perform a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data. In some embodiments, the storage medium 1004 also stores information needed for performing a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data as well as information generated during performing a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data, such as a sensor data parameter 1016, a threshold parameter 1018, a vehicle parameter 1020, a hit points parameter 1022 and/or a set of executable instructions to perform a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data.

In some embodiments, the storage medium 1004 stores instructions 1007 for interfacing with external devices. The instructions 1007 enable processor 1002 to generate instructions readable by the external devices to effectively implement a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data is implemented in two or more systems 1000, and information such as sensor data, bridge location, frequency range and extra fiber portions are exchanged between different systems 1000 via network 1014.

System 1000 is configured to receive information related to a DFOS data through I/O interface 1010 or network interface 1012. The DFOS data is transferred to processor 1002 via bus 1008 for estimation of a frequency range and preprocess and/or filtering. The frequency range is stored in the computer readable medium 1004 as the frequency ranges parameter 1020. In some embodiments, the estimated frequency range parameter 1020 is received through the I/O 1010 or the network interface 1012. The preprocessed DFOS data is then stored in computer readable medium 1004 as sensor data parameter 1016. The processor 1002 retrieves the sensor data parameter 1016 from the computer readable medium 1004 and hit points for the hit points parameter 1022. The processor 1002 performs iterative de-noising of the hit points parameter 1022, such as using the threshold parameter 1018. The processor 1002 performs analysis of good clusters remaining following the iterative de-noising to determine vehicle parameters for the vehicle parameter 1020. In some embodiments, the system 1000 is usable to implement a trained NN usable to effectively implement a portion or all of the operations as described with respect to the DAS system 100A (FIG. 1A), the DAS system 100B (FIG. 1B), the method 200 (FIG. 2), the method 900 (FIG. 9), or another suitable processes for analyzing DFOS data.

Supplemental Note 1

A vehicle tracking method includes receiving distributed optical fiber sensing (DFOS) data. The vehicle tracking method further includes identifying hit points within the DFOS data, wherein each of the hit points corresponds to a location of a corresponding vehicle at a detection time. The vehicle tracking method further includes clustering the identified hit points to define one or more clusters. The vehicle tracking method further includes classifying each of the one or more clusters into a first classification or a second classification, wherein the classifying is based on a quantity of the hit points in each of the one or more clusters and a quantity of the detection times. The vehicle tracking method further includes estimating a vehicle parameter of a first vehicle corresponding to the hit points of a first cluster of the one or more clusters, wherein the first cluster has the first classification, and the estimating is based on the hit points of the first cluster.

Supplemental Note 2

The vehicle tracking method of Supplemental Note 1, further including: removing an earliest detected hit point of each of the one or more clusters having the second classification; and iteratively repeating the clustering, the classifying, and the removing until only clusters of the one or more clusters having the first classification remain.

Supplemental Note 3

The vehicle tracking method of Supplemental Note 2, further including reducing the quantity of the detection times by one in response to the removing the earliest detected hit point.

Supplemental Note 4

The vehicle tracking method of Supplemental Note 1, wherein estimating the vehicle parameter comprises estimating at least one of speed, acceleration, or lane changing.

Supplemental Note 5

The vehicle tracking method of Supplemental Note 1, wherein the classifying comprises: determining a threshold based on the quantity of detection times; comparing the quantity of hit points in a corresponding cluster of the one or more clusters for each of the one or more hit points; classifying the corresponding cluster as the first classification in response to a determination that the quantity of hit points in the corresponding cluster is equal to or greater than the threshold; and classifying the corresponding cluster as the second classification in response to a determination that the quantity of hit points in the corresponding cluster is less than the threshold.

Supplemental Note 6

The vehicle tracking method of Supplemental Note 5, wherein determining the threshold comprises multiplying the quantity of detected times by a selected percentage.

Supplemental Note 7

The vehicle tracking method of Supplemental Note 6, wherein the vehicle parameter includes speed, acceleration, or lane changing.

Supplemental Note 8

The vehicle tracking method of Supplemental Note 1, further including transmitting the estimated vehicle parameter to an external device.

Supplemental Note 9

A vehicle tracking system including a non-transitory computer readable medium configured to store instructions thereon; and a processor connected to the non-transitory computer readable medium. The processor is configured to execute the instructions for receiving distributed optical fiber sensing (DFOS) data. The processor is further configured to execute the instructions for identifying hit points within the DFOS data, wherein each of the hit points corresponds to a location of a corresponding vehicle at a detection time. The processor is further configured to execute the instructions for clustering the identified hit points to define one or more clusters. The processor is further configured to execute the instructions for classifying each of the one or more clusters into a first classification or a second classification, wherein the classifying is based on a quantity of the hit points in each of the one or more clusters and a quantity of the detection times. The processor is further configured to execute the instructions for estimating a vehicle parameter of a first vehicle corresponding to the hit points of a first cluster of the one or more clusters, wherein the first cluster has the first classification, and the estimating is based on the hit points of the first cluster.

Supplemental Note 10

The vehicle tracking system of Supplemental Note 9, wherein the processor is further configured to execute the instructions for removing an earliest detected hit point of each of the one or more clusters having the second classification; and iteratively repeating the clustering, the classifying, and the removing until only clusters of the one or more clusters having the first classification remain.

Supplemental Note 11

The vehicle tracking system of Supplemental Note 10, wherein the processor is further configured to execute the instructions for reducing the quantity of the detection times by one in response to the removing the earliest detected hit point.

Supplemental Note 12

The vehicle tracking system of Supplemental Note 9, wherein the processor is configured to execute the instructions for estimating the vehicle parameter by estimating at least one of speed, acceleration, or lane changing.

Supplemental Note 13

The vehicle tracking system of Supplemental Note 9, wherein the processor is configured to execute the instructions for the classifying by: determining a threshold based on the quantity of detection times; comparing the quantity of hit points in a corresponding cluster of the one or more clusters for each of the one or more hit points; classifying the corresponding cluster as the first classification in response to a determination that the quantity of hit points in the corresponding cluster is equal to or greater than the threshold; and classifying the corresponding cluster as the second classification in response to a determination that the quantity of hit points in the corresponding cluster is less than the threshold.

Supplemental Note 14

The vehicle tracking system of Supplemental Note 13, wherein the processor is configured to execute the instructions for determining the threshold by multiplying the quantity of detected times by a selected percentage.

Supplemental Note 15

The vehicle tracking system of Supplemental Note 14, wherein the vehicle parameter includes speed, acceleration, or lane changing.

Supplemental Note 16

The vehicle tracking system of Supplemental Note 9, wherein the processor is further configured to execute the instructions for instructing a transmitter to transmit the estimated vehicle parameter to an external device.

Supplemental Note 17

A non-transitory computer readable medium configured to store instructions thereon for causing a processor to receive distributed optical fiber sensing (DFOS) data. The instructions are further configured to cause the processor to identify hit points within the DFOS data, wherein each of the hit points corresponds to a location of a corresponding vehicle at a detection time. The instructions are further configured to cause the processor to cluster the identified hit points to define one or more clusters. The instructions are further configured to cause the processor to classify each of the one or more clusters into a first classification or a second classification, wherein the classifying is based on a quantity of the hit points in each of the one or more clusters and a quantity of the detection times. The instructions are further configured to cause the processor to estimate a vehicle parameter of a first vehicle corresponding to the hit points of a first cluster of the one or more clusters, wherein the first cluster has the first classification, and the estimating is based on the hit points of the first cluster.

Supplemental Note 18

The non-transitory computer readable medium of Supplemental Note 17, wherein the instructions are further configured to cause the processor to: remove an earliest detected hit point of each of the one or more clusters having the second classification; and iteratively repeat the clustering, the classifying, and the removing until only clusters of the one or more clusters having the first classification remain.

Supplemental Note 19

The non-transitory computer readable medium of Supplemental Note 18, wherein the instructions are further configured to cause the processor to reduce the quantity of the detection times by one in response to the removing the earliest detected hit point.

Supplemental Note 20

The non-transitory computer readable medium of Supplemental Note 17, wherein the instructions are further configured to cause the processor to: determine a threshold based on the quantity of detection times; compare the quantity of hit points in a corresponding cluster of the one or more clusters for each of the one or more hit points; classify the corresponding cluster as the first classification in response to a determination that the quantity of hit points in the corresponding cluster is equal to or greater than the threshold; and classify the corresponding cluster as the second classification in response to a determination that the quantity of hit points in the corresponding cluster is less than the threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vehicle tracking method comprising:
receiving distributed optical fiber sensing (DFOS) data;
identifying hit points within the DFOS data, wherein each of the hit points corresponds to a location of a corresponding vehicle at a detection time;
clustering the identified hit points to define one or more clusters;
classifying each of the one or more clusters into a first classification or a second classification, wherein the classifying is based on a quantity of the hit points in each of the one or more clusters and a quantity of the detection times;
estimating a vehicle parameter of a first vehicle corresponding to the hit points of a first cluster of the one or more clusters, wherein the first cluster has the first classification, and the estimating is based on the hit points of the first cluster;
removing an earliest detected hit point of each of the one or more clusters having the second classification; and
iteratively repeating the clustering, the classifying, and the removing until only clusters of the one or more clusters having the first classification remain.

2. The vehicle tracking method of claim 1, further comprising reducing the quantity of the detection times by one in response to the removing the earliest detected hit point.

3. The vehicle tracking method of claim 1, wherein estimating the vehicle parameter comprises estimating at least one of speed, acceleration, or lane changing.

4. The vehicle tracking method of claim 1, wherein the classifying comprises:
determining a threshold based on the quantity of detection times;
comparing the quantity of hit points in a corresponding cluster of the one or more clusters for each of the one or more hit points;
classifying the corresponding cluster as the first classification in response to a determination that the quantity of hit points in the corresponding cluster is equal to or greater than the threshold; and
classifying the corresponding cluster as the second classification in response to a determination that the quantity of hit points in the corresponding cluster is less than the threshold.

5. The vehicle tracking method of claim 4, wherein determining the threshold comprises multiplying the quantity of detected times by a selected percentage.

6. The vehicle tracking method of claim 1, wherein the vehicle parameter comprises speed, acceleration, or lane changing.

7. The vehicle tracking method of claim 1, further comprising transmitting the estimated vehicle parameter to an external device.

8. A vehicle tracking system comprising:
a non-transitory computer readable medium configured to store instructions thereon; and
a processor connected to the non-transitory computer readable medium, wherein the processor is configured to execute the instructions for:
receiving distributed optical fiber sensing (DFOS) data;
identifying hit points within the DFOS data, wherein each of the hit points corresponds to a location of a corresponding vehicle at a detection time;
clustering the identified hit points to define one or more clusters;
classifying each of the one or more clusters into a first classification or a second classification, wherein the classifying is based on a quantity of the hit points in each of the one or more clusters and a quantity of the detection times;
estimating a vehicle parameter of a first vehicle corresponding to the hit points of a first cluster of the one or more clusters, wherein the first cluster has the first classification, and the estimating is based on the hit points of the first cluster;
removing an earliest detected hit point of each of the one or more clusters having the second classification; and
iteratively repeating the clustering, the classifying, and the removing until only clusters of the one or more clusters having the first classification remain.

9. The vehicle tracking system of claim 8, wherein the processor is further configured to execute the instructions for reducing the quantity of the detection times by one in response to the removing the earliest detected hit point.

10. The vehicle tracking system of claim 8, wherein the processor is configured to execute the instructions for estimating the vehicle parameter by estimating at least one of speed, acceleration, or lane changing.

11. The vehicle tracking system of claim 8, wherein the processor is configured to execute the instructions for the classifying by:
determining a threshold based on the quantity of detection times;
comparing the quantity of hit points in a corresponding cluster of the one or more clusters for each of the one or more hit points;
classifying the corresponding cluster as the first classification in response to a determination that the quantity of hit points in the corresponding cluster is equal to or greater than the threshold; and
classifying the corresponding cluster as the second classification in response to a determination that the quantity of hit points in the corresponding cluster is less than the threshold.

12. The vehicle tracking system of claim 11, wherein the processor is configured to execute the instructions for determining the threshold by multiplying the quantity of detected times by a selected percentage.

13. The vehicle tracking system of claim 8, wherein the vehicle parameter comprises speed, acceleration, or lane changing.

14. The vehicle tracking system of claim 8, wherein the processor is further configured to execute the instructions for instructing a transmitter to transmit the estimated vehicle parameter to an external device.

15. A non-transitory computer readable medium configured to store instructions thereon for causing a processor to:
- receive distributed optical fiber sensing (DFOS) data;
- identify hit points within the DFOS data, wherein each of the hit points corresponds to a location of a corresponding vehicle at a detection time;
- cluster the identified hit points to define one or more clusters;
- classify each of the one or more clusters into a first classification or a second classification, wherein the classifying is based on a quantity of the hit points in each of the one or more clusters and a quantity of the detection times;
- estimate a vehicle parameter of a first vehicle corresponding to the hit points of a first cluster of the one or more clusters, wherein the first cluster has the first classification, and the estimating is based on the hit points of the first cluster;
- remove an earliest detected hit point of each of the one or more clusters having the second classification; and
- iteratively repeat the clustering, the classifying, and the removing until only clusters of the one or more clusters having the first classification remain.

16. The non-transitory computer readable medium of claim 15, wherein the instructions are further configured to cause the processor to reduce the quantity of the detection times by one in response to the removing the earliest detected hit point.

17. The non-transitory computer readable medium of claim 15, wherein the instructions are further configured to cause the processor to:
- determine a threshold based on the quantity of detection times;
- compare the quantity of hit points in a corresponding cluster of the one or more clusters for each of the one or more hit points;
- classify the corresponding cluster as the first classification in response to a determination that the quantity of hit points in the corresponding cluster is equal to or greater than the threshold; and
- classify the corresponding cluster as the second classification in response to a determination that the quantity of hit points in the corresponding cluster is less than the threshold.

* * * * *